April 10, 1962 L. M. CASKEY ETAL 3,028,669
GRASS TRIMMER FOR SPRINKLER HEADS
Filed April 24, 1961 2 Sheets-Sheet 1
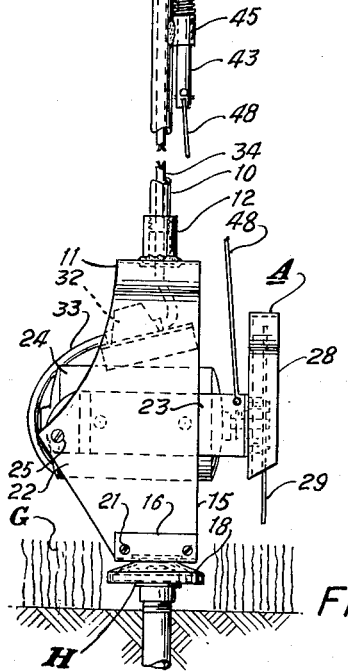
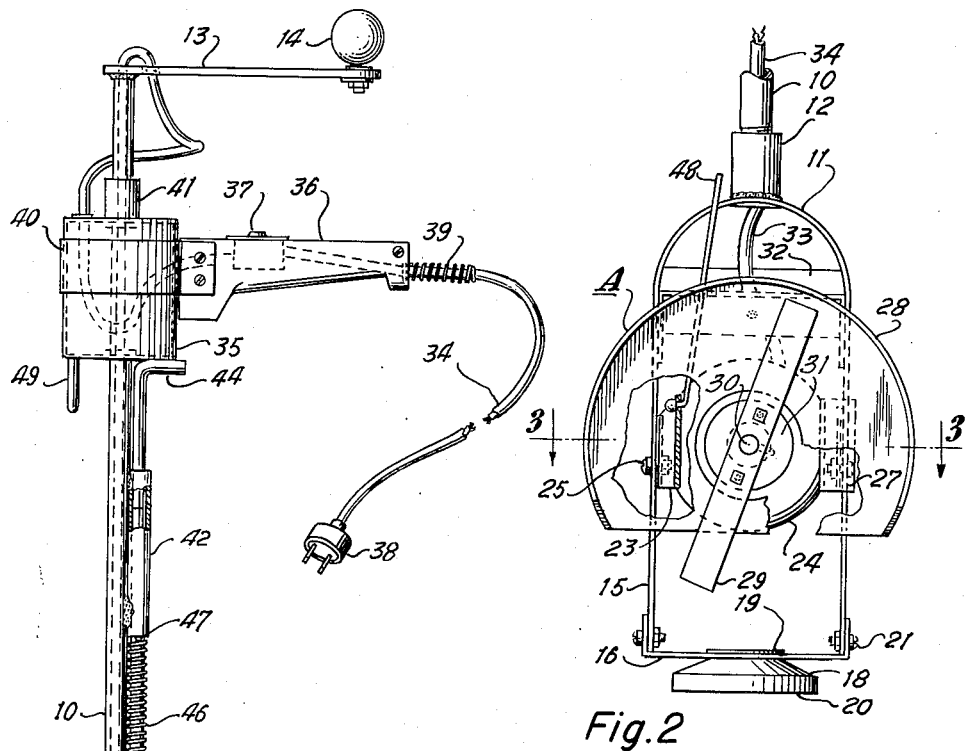
Fig.2
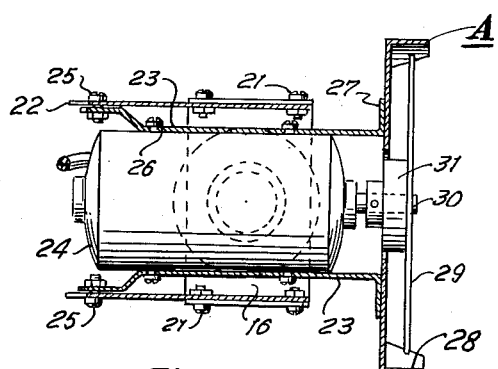
Fig.3
INVENTORS
Lutha M. Caskey
John R. Salmon
BY Shley & Shley
ATTORNEYS

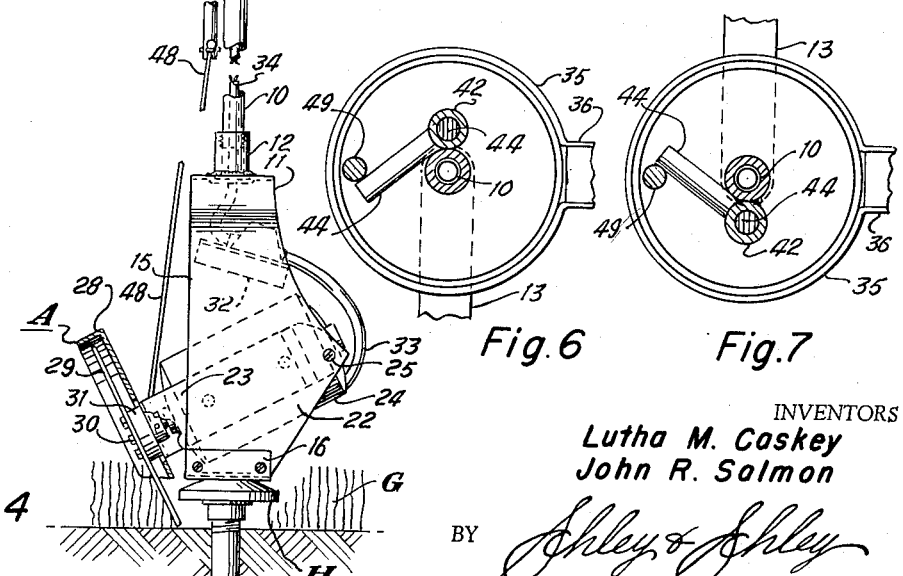

United States Patent Office 3,028,669
Patented Apr. 10, 1962

3,028,669
GRASS TRIMMER FOR SPRINKLER HEADS
Lutha M. Caskey and John R. Salmon, both of
601 W. 11th St., San Angelo, Tex.
Filed Apr. 24, 1961, Ser. No. 105,180
13 Claims. (Cl. 30—276)

This invention relates to new and useful improvements in trimmers for cutting grass around the heads of underground sprinkler systems.

One object of the invention is to provide an improved trimmer for cutting grass around the heads of underground sprinkler systems so as to enhance the appearance and increase the efficiency thereof.

A particular object of the invention is to provide an improved grass trimmer for use with sprinkler heads having means for pivotally supporting a grass cutter assembly for rotation about the axis of a sprinkler head so as to permit cutting of the surrounding grass at an acute angle.

Another object of the invention is to provide an improved grass trimmer, of the character described, having means rotatable and movable longitudinally relative to the means for pivotally supporting the grass cutter assembly so as to permit relative rotation of said assembly and for imparting pivotal movement to said assembly by relative longitudinal movement.

A further object of the invention is to provide an improved grass trimmer, of the character described, wherein the grass cutter assembly has its pivot off-center thereof whereby said assembly is pivoted downwardly by its weight so as to permit said assembly to ride over stationary obstacles by upward pivoting and thereby prevent damaging of said assembly.

Another object of the invention is to provide an improved grass trimmer, of the character described, having means rotatably suspended from the grass cutter assembly supporting means for engaging over and remaining stationary with a sprinkler head upon relative rotation of said assembly.

A construction designed to carry out the invention will be hereinafter described, together with other features of the invention.

The invention will be more readily understood from a reading of the following specification and by reference to the accompanying drawings, wherein an example of the invention is shown, and wherein:

FIG. 1 is a side elevational view, partly broken, of a grass trimmer constructed in accordance with the invention and resting on a sprinkler head, FIG. 2 is an enlarged, front elevational view, partly broken away, showing the mounting of the cutter assembly of the grass trimmer, FIG. 3 is a horizontal, cross-sectional view, taken on the line 3—3 of FIG. 2, FIG. 4 is a view, similar to FIG. 1, showing the trimmer in operative position with its cutter assembly pivoted downwardly and the grass surrounding the sprinkler head cut at an acute angle, FIG. 5 is an enlarged, side elevational view, partly in section, showing the rotatable pilot cup of the support for the cutter assembly resting on the sprinkler head, FIG. 6 is a horizontal, cross-sectional view, taken on the line 6—6 of FIG. 4, FIG. 7 is a view, similar to FIG. 6, showing the shaft of the trimmer rotated relative to its handle means, FIG. 8 is a front elevational view, partly in section, of the pilot cup and its mounting bracket, and FIG. 9 is an underside plan view of the pilot cup and bracket.

In the drawings, the numeral 10 designates the elongated, tubular member or shaft of a grass trimmer having an inverted yoke or U-shaped support 11 secured to its lower end by a collar 12 mounted on the bight portion of the yoke. A lateral crank arm 13 is fastened to the upper end of the shaft 10 and has a knob 14 rotatably mounted on its outer end to facilitate turning of said shaft about its longitudinal axis. The yoke 11 turns with the shaft and the lower ends of its legs 15 are connected by a U-shaped bracket or base plate 16 having a medial, circular opening 17. A frustoconical pilot element or cup 18 is suspended for relative rotation from the bracket 16 by an annular, radial flange 19 at the upper end of the cup overlying the margin of said bracket surrounding its opening 17 (FIG. 5). The cup 18 has an annular, axial flange 20 on its lower, larger end and is adapted to engage over and rest upon the head H of an underground grass sprinkling system (not shown). A plurality of nuts and bolts 21 detachably fasten the bracket 16 to the yoke legs 15 so as to permit the substitution of pilot cups of different diameter in accordance with the size of the sprinkler head.

As shown most clearly in FIGS. 1–4, the width of the yoke legs is increased intermediate their ends to provide lateral extensions 22 for pivotally supporting therebetween the opposed angular mounting plates 23 of a grass cutter assembly A having an electric motor 24. One end portion of each plate 23 is offset outwardly and is pivoted to the adjacent leg extension 22 by a suitable nut and bolt 25 (FIG. 3). The opposite end of each mounting plate, which is fastened to each side of the motor 24 by a pair of screws 26, has an out-turned flange 27 welded or otherwise secured to a semi-circular guard 28 for a cutter blade 29 fixed on the shaft 30 of said motor by a hub 31. A terminal block 32 is mounted in the upper portion of the yoke 11 above and connected to the motor by an electrical conductor 33 for connection with an electrical conductor 34 extending upwardly through the collar 12 and shaft 10 (FIG. 2). From the upper end of the shaft, the conductor 34 extends through a cylindrical body or housing 35, rotatably and slidably confined on said shaft, and then longitudinally through a handle 36 having a control switch 37 mounted therein. A conventional plug 38 is carried by the free end of the conductor for connection with an electrical current source (not shown) and said conductor may be urged inwardly of the handle by a helical spring 39.

The handle 36 extends radially from the body 35 and has its inner end fastened thereto by a clamp or strap 40 which encircles said body (FIGS. 1 and 2). A collar 41 is fixed on the shaft 10 above the body to limit relative upward movement of the latter and relative downward movement of said body is limited by a sleeve 42 extending longitudinally of said shaft and welded or otherwise secured thereto below said body. A cylindrical element or rod 43 is slidably mounted in the sleeve 42 and in an alined collar 45 fastened to the shaft in underlying, spaced relation to said sleeve, and an angular rod 44 is rotatably and slidably mounted in said sleeve above and in engagement with the rod 43. The rod 43 is constantly urged upwardly to maintain the rod 44 in engagement with the underside of the body 35 by a helical spring 46 confined on said rod 43 between the collar 45 and a transverse pin or stop 47. A cable or wire 48 pivotally connects the lower end of the rod 43 to one of the mounting plates 23 adjacent the blade guard 28 for supporting the cutter blade 29 in parallel relation to the shaft when the body is in its uppermost position. Upon downward movement of the body 35 relative to the shaft, the rods 43 and 44 are pushed downwardly to permit downward pivoting of the assembly A and inclination of its cutter blade relative to the shaft (FIG. 4). Due to the compression of the spring 46, the rods are pushed upwardly to pivot the cutter assembly upwardly when the body is raised relative to the shaft.

The cutter assembly A is adapted to be rotated about the axis of the sprinkler head H to trim the surrounding grass G at approximately a 30° angle to the vertical (FIG. 4). The trimmer is supported by the handle 36 of its body 35 and by resting its pilot cup 18 on the sprinkler head. Upon swinging of the crank arm 13, the shaft 10 is turned relative to the body and handle so as to rotate the cutter assembly. It is noted that the rotatable mounting of the pilot cup permits it to remain stationary with the sprinkler head upon rotation of the assembly A. Due to the offsetting of the pivot point 25, the weight of the cutter assembly causes downward pivoting thereof when the handle is depressed to push the rods 43 and 44 downwardly. Since its weight is the only downward force applied to the assembly, it is free to pivot upwardly and ride over stationary obstacles and thereby prevent damaging of its blade 28. A stop in the form of a pin 49 depends from the body for engaging the angular rod 44 to limit relative rotation of the shaft and cutter assembly and thereby prevent excessive twisting of the conductor 34. Since the rod 44 is rotatable with and relative to the shaft, said rod may move between the positions shown in FIGS. 6 and 7. Thus, a relative rotation of approximately 540° is permitted. In addition to providing an attractive and neat, bevelled grass edge around sprinkler heads, the trimmer removes leaves and other debris from around said heads so that the same will operate properly and more evenly distribute water.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A trimmer for cutting grass at an acute angle around the heads of underground sprinkler systems including a grass cutter assembly, a shaft, a support for pivotally attaching the grass cutter assembly to one end of the shaft, handle means rotatably and slidably confined on said shaft, means extending and movable longitudinally of said shaft between the handle means and cutter assembly for pivoting said assembly relative to the support upon longitudinal movement of said handle means relative to said shaft, and means for imparting rotation to said shaft to turn said cutter assembly, support and shaft relative to said handle means.

2. A grass trimmer as set forth in claim 1 including means on the support for engaging over a sprinkler head to permit rotation of the grass cutter assembly about the axis of the sprinkler head.

3. A grass trimmer as set forth in claim 1 including means for limiting relative movement between the shaft and handle means.

4. A grass trimmer as set forth in claim 1 including means rotatably suspended from the support for resting on a sprinkler head to permit relative rotation of the grass cutter assembly about the axis of the sprinkler head.

5. A grass trimmer as set forth in claim 1 wherein the means for pivoting the grass cutter assembly includes an element movable longitudinally and engageable with the handle means and having connection with said assembly, and means for urging the element toward said handle means.

6. A grass trimmer as set forth in claim 5 including means on the handle means for engaging the element to limit rotation of the shaft relative to said handle means.

7. A trimmer for cutting grass at an acute angle around the heads of underground sprinkler systems including an upright member, a support at the lower end of the upright member, a grass cutter assembly pivotally mounted on the support, means on said support for engaging over a sprinkler head to position the grass cutter assembly, a body rotatably and slidably confined on the upper portion of said member, means extending and movable longitudinally of said member between the body and cutter assembly for pivoting said assembly upon longitudinal movement of said body relative to said member, and means for imparting rotation to said member to turn said cutter assembly, support and member relative to said body.

8. A grass trimmer as set forth in claim 7 including means for limiting relative movement between the upright member and body.

9. A grass trimmer as set forth in claim 7 wherein the grass cutter assembly has its pivot off-center thereof so as to be pivoted downwardly by its weight.

10. A grass trimmer as set forth in claim 7 wherein the means for pivoting the grass cutter assembly includes a rod engageable and movable longitudinally with the body and having connection with said assembly, and resilient means for maintaining the rod engaged with said body.

11. A grass trimmer as set forth in claim 10 wherein the grass cutter assembly has its pivot off-center thereof whereby said assembly is pivoted downwardly by its weight upon downward movement of the body relative to the upright member and is pivoted upwardly by the resilient means upon upward relative movement of said body.

12. A grass trimmer as set forth in claim 10 including means on the body for engaging the rod to limit rotation of the upright member relative to said body.

13. A grass trimmer as set forth in claim 8 including an element suspended for relative rotation from the support and complementary to a sprinkler head for resting thereon to permit rotation of the grass cutter assembly about the axis of the sprinkler head.

No references cited.